(12) United States Patent
Beckinsale et al.

(10) Patent No.: US 12,392,159 B2
(45) Date of Patent: Aug. 19, 2025

(54) SET OF FLANGES; AN INSTALLATION COMPRISING A SET OF FLANGES AND A METHOD OF PROVIDING THE INSTALLATION

(71) Applicant: Wood Thilsted Ltd., London (GB)

(72) Inventors: William Beckinsale, London (GB); Vaughan Pryce-Jenkins, London (GB); Christian Leblanc Thilsted, London (GB); Alastair Muir Wood, London (GB); Daniel Bonnett, London (GB); Morten Nielsen, London (GB); Matthew Simms, London (GB)

(73) Assignee: WOOD THILSTED LTD., London (GB)

( * ) Notice: Subject to any disclaimer, the term of this patent is extended or adjusted under 35 U.S.C. 154(b) by 0 days.

(21) Appl. No.: 18/351,650

(22) Filed: Jul. 13, 2023

(65) Prior Publication Data

US 2024/0018797 A1 Jan. 18, 2024

(30) Foreign Application Priority Data

Jul. 14, 2022 (DK) .......................... PA 2022 70381

(51) Int. Cl.
*E04H 12/08* (2006.01)
*F16L 23/032* (2006.01)

(52) U.S. Cl.
CPC .......... *E04H 12/085* (2013.01); *F16L 23/032* (2013.01)

(58) Field of Classification Search
CPC ............................. E04H 12/085; F16L 23/032
See application file for complete search history.

(56) References Cited

U.S. PATENT DOCUMENTS 1,045,389 A * 11/1912 Gillmor ................ F16L 23/032
285/368
7,096,639 B2 * 8/2006 Wobben ................ E04H 12/085
52/741.15

(Continued)

FOREIGN PATENT DOCUMENTS

EP   3 219 876 B1   5/2019
EP   4 019 769 A1   6/2022

(Continued)

OTHER PUBLICATIONS

Extended European Search Report issued in corresponding application, EP 23 18 5085, dated Oct. 27, 2023.

(Continued)

*Primary Examiner* — Andrew J Triggs
(74) *Attorney, Agent, or Firm* — Chrisman Gallo Tochtrop LLC

(57) ABSTRACT

A set of flanges, an installation including the set of flange and a method for providing the installation are disclosed. The set of flanges includes a first annular flange with a first front side and a second annular flange with a second front side. Each flange includes a plurality of through holes for mounting the flanges with the first side facing the second side. The first and the second sides are shaped such that the annular toe surface section of the first front side is adapted to provide an annular toe contact region with the annular toe surface section of the second front side and the annular heel surface section of the first front surface is adapted to provide annular heel contact region with the annular heel surface section of the second front side whereby an intermediate annular gap is provided between the annular toe contact region and the annular heel contact region.

20 Claims, 5 Drawing Sheets

(56) References Cited

U.S. PATENT DOCUMENTS

| | | | |
|---|---|---|---|
| 7,566,080 B2 * | 7/2009 | Howard | F16L 23/032 |
| | | | 285/368 |
| 11,300,236 B2 * | 4/2022 | Liszkai | G21C 13/063 |
| 12,163,503 B2 * | 12/2024 | Klaassen | E04H 12/085 |
| 2004/0112002 A1 | 6/2004 | Wobben | |
| 2007/0102926 A1 * | 5/2007 | Magnier | F16L 23/032 |
| | | | 285/368 |
| 2010/0117353 A1 | 5/2010 | Ma | |
| 2015/0308097 A1 | 10/2015 | Kosuri | |
| 2016/0130779 A1 * | 5/2016 | Van Dijk | E02D 27/425 |
| | | | 405/228 |
| 2019/0161991 A1 | 5/2019 | Mtauweg et al. | |
| 2020/0096143 A1 | 3/2020 | Liszkai | |
| 2022/0003344 A1 | 1/2022 | Klaassen et al. | |
| 2022/0195988 A1 | 6/2022 | Klaasen et al. | |
| 2024/0018797 A1 * | 1/2024 | Beckinsale | E04H 12/085 |

FOREIGN PATENT DOCUMENTS

| | | |
|---|---|---|
| GB | 1085027 A | 9/1967 |
| JP | 2000-265571 A | 9/2000 |
| KR | 10-0759836 B1 | 9/2007 |
| WO | 2020/089020 A1 | 5/2020 |
| WO | 2021/254890 A1 | 12/2021 |

OTHER PUBLICATIONS

1st Examination Report issued in corresponding Danish application, PA 2022 70381, dated Jan. 17, 2023.

* cited by examiner

SET OF FLANGES; AN INSTALLATION COMPRISING A SET OF FLANGES AND A METHOD OF PROVIDING THE INSTALLATION

CROSS-REFERENCE TO RELATED APPLICATION

This application claims benefit of priority to Denmark application PA 2022 70381, filed Jul. 14, 2022, the entire disclosures of which are hereby incorporated herein by reference.

TECHNICAL FIELD

The present invention relates to a set of flanges for coupling elements, such as tubular elements e.g. forming part of an installation comprising a wind turbine, a tower and/or a foundation. The invention also comprises an installation and a method of providing an installation.

BACKGROUND

An installation comprising free standing tower structures, such as wind turbine tower installations generally requires connecting two or more elements, such as tower section(s), transition piece (TP), foundation and/or wind turbine. Sections of such an installation are normally build in lengths that are practical to handle to transport to the installation site etc. Wind turbine tower installations and similar installations are often provided by connecting elements thereof by grouted connections. In recent years also flanged connections have been provided to ensure a strong and durable connection. Flanged connections, where flanges are bolted together may be faster to install. The loads on such flanged connections are generally very high and of dynamic nature due to the varying wind or even storms inducing loads and vibrations to the entire installation. To withstand such high loads, the requirements to strong connections are very high and increasing as the installations becomes larger and larger. Over the year a number of different designs have been developed, but still the industry is experiencing challenges with the existing flanged connections in particular in offshore installed wind turbine towers, in large installations e.g. large tower structures and similar load bearing structures subjected to dynamic loads on the structure by wind and/or waves.

A particular challenges for bolted flange connection of large tower installations, such as wind turbine tower installations, are related to structural strength of the flange connection connecting sections of the installation, fatigue resistance of the flange connection due to the dynamic response to the wind and/or water wave loads, and loosening of the fasteners e.g. bolts and nuts of the flange connection during operation due to vibration caused by wind and/or water wave.

WO 2020/089020 discloses flanges for a flange connection where the faces of the contacting flanges are corresponding to each other and has respective wedge areas with a first radial angle and heel area with a heel surface of a larger radial angle and an intermediate recess where the holes for the bolt are located.

The flange design provides a structure where the bolts may be kept dry and further allows a high contact stress distribution at the heel area.

WO21254890 discloses a flange configured for being mounted to a counter-flange with bolts) extending through a plurality of through holes distributed along a circumference of at least one of the flange and the counter flange. The flange comprises a first ring-shaped radially outwards contact surface and a ring-shaped discontinuous radially inwards contact surface. The first ring-shaped contact surface and the ring-shaped discontinuous contact surface are arranged such that the plurality of through holes is arranged between the first ring-shaped contact surface and the ring-shaped discontinuous contact surface. The radially inwards discontinuous ring-shape compensates for unavoidable manufacturing tolerances which otherwise may lead to a long gap. Thereby only small gaps remain.

US2004112002 discloses an annular flange connection for connecting tubular components wherein the outer walls of the tubular portions are conical. The two flanges for the flange connection are welded to their respective tubular portions and each flange have a planar flange protruding radially inwards from their respective tubular portions. The planar flanges have surfaces of equal size i.e. with an identical inner and outer diameter—and are screwed together facing each other. The uppermost flange has a recess and number of through bores for the screws are provided through the void provided by the recess. Thereby the area of force transfer or flow of force through flange surfaces is displaced radially from the through bores into a radially inward area and a radially outward area of the flange surfaces.

DISCLOSURE OF INVENTION

An objective of the invention is to provide a set of flanges which may provide a very strong flanged connection between elements of an installation subjected to high and dynamic loads.

In an embodiment of the invention it is an object to provide a set of flanges for establishing a flange connection which has a high resistance against vibrations and particularly wherein fasteners connecting the flanges may be mounted with a high pre-stress.

In an embodiment of the invention it is an object to provide a set of flanges for establishing a flange connection with fasteners, wherein the set of flanges provides a reduced tendency for the fasteners to prying and/or slacking.

In an embodiment of the invention it is an object to provide a set of flanges for establishing a flange connection, which flanges has a high resistance against local fatigue.

In an embodiment of the invention it is an object to provide an installation comprising a flanged connection capable of withstanding high and dynamic loads.

In an embodiment of the invention it is an object to provide an installation comprising a flanged connection, where the requirement to retightening of fasteners may be relatively low.

In an embodiment of the invention it is an object to provide a method of providing an installation which is relatively cost effective and wherein the method comprises providing a flanged connection with a long durability, high strength and a high resistance against local fatigue.

These and other objects have been solved by the invention as defined in the claims and as described herein below.

It has been found that the invention or embodiments thereof have a number of additional advantages, which will be clear to the skilled person from the following description.

The set of flanges comprises a first annular flange having a first front side and a second annular flange having a second front side. The first annular flange and the second annular flange each comprises a plurality of through holes along their respective annular extension, wherein the plurality of through holes of the first annular flange corresponds with the plurality of through holes of the second annular flange to provide that the first annular flange and the second annular flange are adapted for being assembled with the first front side facing the second front side of the respective first annular flange and second annular flange.

The first annular flange and the second annular flange are conveniently adapted for being mounted to respective elements, preferably by welding to provide that these elements may be connected to each other by a flanged connection provided by the set of flanges. The elements may advantageously be tubular elements where the flanges are mounted to protrude radially inwards as further described below.

The first front side of the first annular flange comprises an annular toe surface section and an annular intermediate region comprising an annular beveled surface section located radially inwards to the annular toe surface section and radially outwards to the through holes. The annular intermediate region of the first annular flange beneficially comprises an annular intermediate surface section preferably located radially inwards to the annular beveled surface section. The first front side further comprises an annular flat surface section located radially inwards to the annular intermediate region and comprising an annular heel surface section located radially inwards to the through holes.

The second front side of the second annular flange comprises an annular heel surface section and an annular intermediate region comprising annular beveled surface section located radially outwards to the annular heel surface section and radially inwards to the through holes. The annular intermediate region of the second annular flange beneficially comprises an annular intermediate surface section preferably located radially outwards to the annular beveled surface section of the second annular flange. The second front side further comprises an annular flat surface section located radially outwards to the annular intermediate region of the second annular flange and comprising an annular toe surface section located radially outwards to the through holes.

The annular toe surface section of the first front side is adapted to provide a contact surface with the annular toe surface section of the second front side and the annular heel surface section of the first front surface is adapted to provide a contact surface with the annular heel surface section of the second front side. The annular intermediate region of the first annular flange and the second annular flange thereby upon assembling provides a gap, therein the through holes are located with openings to the gap, preferably to allow fastening elements passing through the gap.

The inventors of the present invention has found that by providing the set of flanges with the described gap a very strong flanged connection may be ensured, thereby enabling a very strong flanged connection between elements of an installation which may be subjected to high and dynamic loads. In addition, it has been found that the flanges may be fabricated at relatively low cost e.g. by machining e.g. milling to provide the annular beveled surface sections of the respective first annular flange and second annular flange. Thereby the gap between the assembled first annular flange and second annular flange may be provided in a relatively simple way without requiring providing one or more recesses in the flanges and in addition the flanges are very resilient to tolerances. Thus the flanges may be fabricated at very low risk for inducing defects and at a relative low cost. In addition as described further below, it has been found that the shape of the formed gap ensures that the requirement to retightening of fasteners may be relatively low compared with prior art flanged connections.

Thanks to the present invention, a very large and valuable contribution to the art has been provided which results in a very strong, durable and cost effective flanged connection.

Reference made to "some embodiments" or "an embodiment" means that a particular feature, structure, or characteristic described in connection with such embodiment(s) is included in at least one embodiment of the subject matter disclosed. Thus, the appearance of the phrases "in some embodiments" or "in an embodiment" in various places throughout the specification is not necessarily referring to the same embodiment(s). Further, the skilled person will understand that particular features, structures, or characteristics may be combined in any suitable manner within the scope of the invention as defined by the claims.

The term "substantially" should herein be taken to mean that ordinary product variances and tolerances are included.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

Advantageously, the plurality of through holes of the first annular flange corresponds with the plurality of through holes of the second annular flange in that a plurality of the through holes of the first annular flange are located complementary to respective through holes of the plurality of through holes of the second annular flange for assembling the first annular flange and the second annular flange to each other.

The plurality of through holes of each of the respective first annular flange and second annular flange may be located by any configuration, as long as they are located to pass through the respective first annular flange and second annular flange at a location between the annular toe surface section and the annular heel surface section.

To ensure a desired distribution of the contact pressure it is desired that the plurality of through holes of each of the respective first annular flange and second annular flange are located along one or more annular lines, such as two annular lines.

It has been found that for optimal contact pressure distribution it is desired that the through holes of each of the respective first annular flange and second annular flange are located along a single annular line, preferably with identical radial distance to the annular heel surface section of respectively the first annular flange and the second annular flange.

In an embodiment, the plurality of through holes of each of the respective first annular flange and second annular flange comprises N through holes located with an X-fold rotational symmetry, wherein X is N or X is N/4.

Advantageously, the plurality of through holes of each of the respective first annular flange and second annular flange are located with even distances along the single annular line, thereby ensuring an even distribution of the contact pressure along the contacting annular toe surface sections and the contacting annular heel surface sections of the respective first annular flange and second annular flange.

In an embodiment, the plurality of through holes of each of the respective first annular flange and second annular flange are located with even distances along the single annular line except for one or more through holes, such as up to 5% of the through holes which may be omitted e.g.

because the location prevent fasteners for being mounted at through holes at that location, wherefore they may be omitted.

The single annular line along which the through holes are distributed may conveniently be oval, egg-shaped or circular. Preferably the single annular line along which the through holes are distributed is circular.

The through holes may in principle have any cross sectional shapes.

Advantageously, the plurality of through holes of each of the respective first annular flange and second annular flange have cross-sectional shapes, which for the respective through hole independently of each other are selected from circular, oval or egg-shaped. Such shapes may be provided by drilling which is relatively simple and does not result in undesired notches or cracks which may result in reduced fatigue strength.

The set of flanges of any one of the preceding claims, wherein the first annular flange and the second annular flange are adapted for being assembled, wherein the assembling conveniently comprises fixing the first annular flange and the second annular flange to each other using fastening elements. Any suitable fasteners may be applied for fixing the first annular flange and the second annular flange. Preferably the fasteners comprises threaded fasteners.

Examples of suitable fasteners comprises threaded fasteners, preferably selected from threaded bars and/or bolts, such as flange bolts, washer bolts, stud bolts, wherein the fasteners may comprise nuts.

In an embodiment, the annular intermediate region of the first front side comprises annular the intermediate surface section located between the annular beveled surface section and the annular heel surface section of the first annular flange and the annular intermediate region of the second front side comprises the annular intermediate surface section located between the annular beveled surface section and the annular toe surface section of the second annular flange.

The respective annular intermediate surface sections of the first annular flange and the second annular flange may in principle have any shape, e.g. comprising notches, depressions or channels, however it is preferred that the respective annular intermediate surface sections of the first annular flange and the second annular flange are flat, thereby simplifying the fabrication of the flanges and without providing unnecessary and optionally damaging carvings in the flange material.

Thus conveniently the annular intermediate surface section of the first annular flange is in plane with the annular heel surface section and the annular intermediate surface section of the second annular flange is in plane with the annular toe surface section, thereby providing a set of flanges that are relatively simple to machining.

In an embodiment, the first annular flange comprises from inside and radially outwards a heel portion comprising the annular heel surface section; an intermediate portion comprising the annular beveled surface section and the annular intermediate surface section; and a toe portion comprising the annular toe surface section.

The second annular flange advantageously comprises from inside and radially outwards a heel portion comprising the annular heel surface section; an intermediate portion comprising the annular beveled surface section and the annular intermediate surface section; and a toe portion comprising the annular toe surface section.

Advantageously each of the first annular flange and the second annular flange has an inner periphery, the respective inner periphery is defined by the respective heel portions, the inner periphery of the respective first annular flange and second annular flange are preferably identical.

Advantageously, the inner periphery of each of the first annular flange and the second annular flange is round, preferably circular or oval.

The plurality of through holes of the first annular flange are preferably located at the intermediate portion of the first annular flange and the plurality of through holes of the second annular flange are located at the intermediate portion of the second annular flange. It has been found that the fasteners used for fixing the first annular flange and the second annular flange to each other, thereby may be preloaded to a desired degree thereby providing reduced tendency for the fasteners to prying and/or slacking. Thus the requirement to retightening of fasteners may be relatively low. In addition, due to the shape of the first annular flange and the second annular flange, preloading the fasteners does not result in significant damaging bending stress in the fasteners.

It has been found that the fasteners conveniently may be preloaded to induce elastic deformation of the respective intermediate portions of the first annular flange and the second annular flange which ensures a very high and evenly distributed contact pressure along the contacting annular heel surface sections and the contacting annular toe surface sections respectively. In addition, the requirement to retightening of fasteners may be even more reduced, thereby reducing time requiring retightening processes i.e. reducing maintaining cost.

The thickness of the various portions of the flanges may be selected to provide a desired strength to material cost.

In an embodiment, the first annular flange has a first average toe thickness ($H1$) at its toe portion determined at a location comprising the annular toe surface section and determined perpendicular to the annular toe surface section The second annular flange may have a second average heel thickness ($H2$) at its heel portion determined at a location comprising the annular heel surface section and determined perpendicular to the annular heel surface section. The first flange and the second flange have a flange width ($W$) determined from and including the annular heel surface section and to and including the annular toe surface section of the respective first and second flanges. Advantageously, each of the first average toe thickness ($H1$) and the second average heel thickness ($H2$) independently of each other is at least 15%, such as from 25% to 75% of the flange width ($W$).

In an embodiment, the first annular flange has a first average intermediate thickness ($h1$) at its intermediate portion determined at a location comprising the annular intermediate surface section and determined parallel to the first average toe thickness ($H1$). The second annular flange may have a second average intermediate thickness ($h2$) at its intermediate portion determined at a location comprising the annular intermediate surface section and determined parallel to the second average heel thickness ($H2$). Advantageously, the first average intermediate thickness ($h1$) is at least 50% of the first average toe thickness ($H1$), such as at least 70%, such as at least 80%, such as at least 90% of the first average toe thickness ($H1$) and/or wherein the second average intermediate thickness ($h2$) is at least 50% of the second average heel thickness ($H2$), such as at least 70%, such as at least 80%, such as at least 90% of the second average heel thickness ($H2$).

In practice it is desired that the difference between the first average intermediate thickness ($h1$) and the first average toe thickness ($H1$) respectively the second average intermediate thickness (h2) and the second average heel thickness (H2) are relatively small such as up to 2 cm advantageously from 1 to 10 mm. A low difference provides a simpler fabrication of the flanges, however, for obtaining a preferred effect of the invention the difference should advantageously not be too small and preferably not less than 1 mm, more preferably not less than 2 mm, such as not less than 3 mm, such as not less than 4 mm, such as not less than 5 mm.

Advantageously the first average intermediate thickness (h1) and the second average intermediate thickness (h2) are identical.

Advantageously, the annular beveled surface section of the first annular flange is sloping downwards from the annular toe surface section of the first annular flange to the annular intermediate surface section of the first annular flange through which the through holes of the first annular flange are passing with an angle $\alpha 1$, which is from more than 90° to less than 180°, such as from 90° to 170°, such as from 110° to 160°, such as from 120° to 150°.

In an embodiment, the annular beveled surface section of the second annular flange is sloping downwards from the annular heel surface section of the second annular flange to an annular intermediate surface section of the second annular flange through which the through holes of the second annular flange are passing with an angle $\alpha 2$, which is from more than 90° to less than 180°, such as from 90° to 170°, such as from 110° to 160°, such as from 120° to 150°.

In an embodiment, the annular toe surface section and the annular beveled surface section of the first annular flange are located radially adjacent to each other with a rounded transition edge there between, preferably the rounded transition edge has a rounding radius of up to 25 mm, such as from 2 mm to 20 mm. The transition edge of the first annular flange advantageously has the angle $\alpha 1$.

In an embodiment, the annular heel surface section and the annular beveled surface section of the second annular flange are located radially adjacent to each other with a rounded transition edge there between, preferably the rounded transition edge has a rounding radius of up to 25 mm, such as from 2 mm to 20 mm. The transition edge of the second annular flange advantageously has the angle $\alpha 2$.

A rounded angle where angle $\alpha 2$ is from 90° to 170° is preferred because it provides a simpler fabrication and reduces the risk of providing undesired notches or cracks in the material, which may result in reduced fatigue strength.

A rounded angle where angle $\alpha 1$ is from 90° to 170° is preferred because it provides a simpler fabrication and reduces the risk of providing undesired notches or cracks in the material, which may result in reduced fatigue strength.

The angle $\alpha 1$ and the angle $\alpha 2$ may be equal or different from each other. Preferably the angle $\alpha 1$ and the annular width of the annular beveled surface section of the first annular flange respectively the angle $\alpha 2$ and the annular beveled surface section of the second annular flange are adjusted to provide that the first average intermediate thickness (h1) and the second average intermediate thickness (h2) are less than 2 mm in difference and preferably identical.

In an embodiment, the annular beveled surface section of the first annular flange and the annular beveled surface section of the second annular flange are parallel with each other in at least 50% of their respective radially width, such as at least 90% of their respective radially width, such as in their entire widths when the first annular flange and the second annular flange are assembled.

In an embodiment, the annular beveled surface section of the first annular flange is sloping downwards from the annular toe surface section of the first annular flange to a depth (d1) determined as the distance between a plan containing the annular toe surface section of the first annular flange and an offset parallel plan containing the location where the annular beveled surface section meets the annular intermediate surface section of the first annular flange. The annular beveled surface section of the second annular flange may advantageously be sloping downwards from the annular heel surface section of the second annular flange to a depth (d2) determined as the distance between a plan containing the annular heel surface section of the second annular flange and an offset parallel plan containing the location where the annular beveled surface section meets the annular intermediate surface section of the second annular flange.

The depth (d1) of the first annular flange and the depth (d2) of the second annular flange, may independently of each other be from 0.1 mm to 2 cm, preferably the depth (d1) of the first annular flange is up to 50% of the first average toe thickness (H1), such as up to 30%, such as up to 20%, such as up to 10% of the first average toe thickness (H1) and/or the depth (d2) of the second annular flange is up to 50% of the second average heel thickness (H2), such as up to 30%, such as up to 20%, such as up to 10% of the second average heel thickness (H2).

Advantageously, the depth (d1) of the first annular flange and the depth (d2) of the second annular flange are less than 2 mm in difference, preferably identical.

Preferably, the angle $\alpha 1$ and the annular width of the annular beveled surface section of the first annular flange respectively the angle $\alpha 2$ and the annular beveled surface section of the second annular flange are adjusted to provide that the depth (d1) of the first annular flange and the depth (d2) of the second annular flange are less than 2 mm in difference, preferably identical.

In an embodiment, the annular intermediate surface section of the first annular flange and/or the annular intermediate surface section of the second annular flange are substantially flat. The annular intermediate surface section of the first annular flange is advantageously parallel with at least one of the annular heel surface section and the annular toe surface section of the first annular flange and/or the annular intermediate surface section of the second annular flange is advantageously parallel with at least one of the annular heel surface section and the annular toe surface section of the second annular flange.

The through holes in the first annular flange are conveniently located to pass through the first front side at the annular intermediate region at a distance L1 from the annular heel surface section of the first annular flange and at a distance L2 from the annular toe surface section of the first annular flange.

The through holes in the second annular flange is conveniently located to pass through the second front side at the annular intermediate region at a distance L3 from the annular heel surface section of the second annular flange and at a distance L4 from the annular toe surface section of the second annular flange.

L1 and L2 may be equal or different from each other

In an embodiment L2≥L1. In an embodiment L1 and L2 is equal or differs up to 50% of the shortest.

L2 and L3 may be equal or different from each other.

In an embodiment, L4≥L3. In an embodiment L3 and L4 is equal or differs up to 50% of the shortest.

In an embodiment, the through holes in the first annular flange is located to pass through the first front side at a distance from the annular beveled surface section of the first annular flange and advantageously the through holes in the second annular flange is located to pass through the second front side at a distance from the annular beveled surface section of the second annular flange. This embodiment may enable preferred high preloading of the fasteners.

It is desired that at least one of the first annular flange and the second annular flange comprises an annular carving for a seal ring to prevent undesired water and/or moisture to penetrate. The carving may advantageously be located in a radially outward section of the toe portion at least one of the first annular flange and the second annular flange.

One of the first annular flange and the second annular flange may comprise a skirt located radially outwards, preferably radially outwards to the toe portion, optionally the skirt may be welded to the toe portion or onto a stub adjacent to the toe portion. In practice, such a skirt may be located only at a lowermost annular flange as described further below.

The first annular flange and the second annular flange are adapted for being welded to respective elements, preferably tubular elements.

The first annular flange may conveniently have a neck portion protruding from the opposite side of the first front side and preferably located at the intermediate portion and/or the toe portion, more preferably the toe portion.

The first annular flange may be mounted to a first element at said neck portion preferably by welding.

The invention also comprises an installation comprising a flange connection between a first element and a second element, wherein the first element and the second element are mounted to respective first and second flanges of the set of flanges according to any one of the preceding claims.

The installation may be any type of installation comprising a flanged connection between two elements, preferably tubular elements, such as elements of an installation subjected to high and dynamic loads. Example of such elements includes foundations or sections thereof, towers or sections thereof, transition pieces or sections thereof as well as wind turbines or sections thereof.

The set of flanges may advantageously be as described above.

In an embodiment, the first annular flange is mounted to the first element and the second annular flange is mounted to the second element e.g. as described above. The first annular flange and the second annular flange may conveniently be disconnectable assembled comprising that they are fixed to each other with the first front side of the first flange facing the second front side of the second flange, wherein the annular toe surface section of the first annular flange and the annular toe surface section of the second annular flange are in surface to surface contact with each other forming an annular toe contact region having an annular toe contact width and wherein the annular heel surface section of the first annular flange and the annular heel surface section of the second annular flange are in surface to surface contact with each other forming an annular heel contact region having an annular heel contact width and wherein the assembled flanges comprises an annular gap located radially between the annular toe contact region and the annular heel contact region, preferably wherein the annular gap has an radially inner beveled border and a radially outer beveled border.

As explained above the structure of the set of flanges ensures a desired evenly distributed contact pressure along the annular toe contact region respectively along the annular heel contact region. The annular toe contact width respectively the annular heel contact width may be relatively narrow compared to the width of the respective first annular flange and second annular flange, thereby ensuring a desired high contact pressure.

Advantageously, the annular gap has an radially inner beveled border and a radially outer beveled border, wherein the radially inner beveled border is formed by the annular beveled surface section of the first annular flange and wherein the radially outer beveled border is formed by the annular beveled surface section of the second annular flange.

The annular gap may conveniently be formed by the annular intermediate region of the first annular flange and the annular intermediate region of the second annular flange. Preferably the annular gap is formed between the annular beveled surface section and the annular intermediate surface section of the first annular flange and annular beveled surface section and the annular intermediate surface section of the second annular flange. Thereby ensuring that the fasteners may be subjected to a desired high preload preferably without plastic deformation of the fasteners.

The annular gap advantageously has a distance (D3) between the annular intermediate surface section of the first annular flange and the annular intermediate surface section of the second annular flange which is from 0.2 mm to 4 cm, such as equal to the sum of the depth (d1) of the first annular flange and the depth (d2) of the second annular flange.

The first annular flange and the second annular flange are advantageously fixed using fastening elements inserted through the corresponding through holes of the respective first annular flange and second annular flange, preferably the fastening elements comprises threaded fasteners.

The fastening elements advantageously passes through the annular gap at a distance from the annular beveled surface section of the first annular flange and at a distance from the annular beveled surface section of the second annular flange, thereby ensuring a very strong connection between the first annular flange and the second annular flange, which in addition may comprise preloading the fasteners to elastic deformation of the respective intermediate portions of the first annular flange and the second annular flange which ensures a very high and evenly distributed contact pressure along the contacting annular heel surface sections and the contacting annular toe surface sections respectively. In addition, the requirement to retightening of fasteners may be even more reduced, thereby reducing time requiring retightening processes i.e. reducing maintaining cost.

One of the first element and the second element may be a lowermost element and the other one of the first element and the second element may be an uppermost element. In an embodiment, the first annular flange is mounted to the lowermost element with its first front side facing upwards and the second annular flange is mounted to the uppermost element with its second front side facing downwards. In an embodiment, the second annular flange is mounted to the lowermost element with its second front side facing upwards and the first annular flange is mounted to the uppermost element with its first front side facing downwards.

In an embodiment, one of the first annular flange and the second annular flange mounted to the lowermost element comprises a skirt. The skirt may be mounted as described above and may have the function of increasing the resistance against intrusion of water or moisture and/or it may provide additional bending resistance to the flanged connection. The skirt defines an annular space between the lowermost element and the skirt, wherein the annular space may be filled with sealing material and/or grout.

Examples of the first and the second elements may be as follows:

In an embodiment, one of the first element and the second element is a transition piece and the other one of the first element and the second element is a wind turbine.

In an embodiment, one of the first element and the second element is a transition piece and the other one of the first element and the second element is a foundation.

In an embodiment, one of the first element and the second element is a transition piece and the other one of the first element and the second element is a tower or a tower section.

In an embodiment, one of the first element and the second element is a first tower section and the other one of the first element and the second element is second tower section.

In an embodiment, one of the first element and the second element is a tower or a tower section and the other one of the first element and the second element is a foundation.

The foundation may for example be a monopile, a jacket, a mono-bucket, a tripod or any other form of foundations.

In an embodiment, the foundation is resting on or fixed into the ground e.g. by being hammered into the ground, e.g. onshore or offshore.

In an embodiment, the foundation is a floating offshore foundation, preferably a moored floating offshore foundation The invention also comprises a method of providing an installation as described above. The method may comprise providing a first element, a second element and a set of flanges according to any of the claims, mounting the first annular flange to the first element by welding, e.g. as described above mounting the second annular flange to the second element by welding, e.g. as described above and assembling the first annular flange to the second annular flange.

The assembling of the first annular flange to the second annular flange advantageously comprises providing that the annular toe surface section of the first annular flange and the annular toe surface section of the second annular flange are in surface to surface contact with each other forming an annular toe contact region having an annular toe contact width and providing that the annular heel surface section of the first annular flange and the annular heel surface section of the second annular flange are in surface to surface contact with each other forming an annular heel contact region having an annular heel contact width and providing that the assembled flanges comprises an annular gap located radially between the annular toe contact region and the annular heel contact region, preferably wherein the annular gap has an radially inner beveled border and a radially outer beveled border.

Advantageously, assembling of the first annular flange to the second annular flange comprises fixing the first annular flange and the second annular flange by inserting fastening elements through corresponding through holes of the respective first annular flange and second annular flange, preferably the fastening elements comprises threaded fasteners, e.g. as described above.

In an embodiment, inserting fastening elements through corresponding through holes comprises passing the fastening elements through the annular gap at a distance from the annular beveled surface section of the first annular flange and at a distance from the annular beveled surface section of the second annular flange.

Advantageously, the method comprises tensioning the fasteners, to provide a preload to the fasteners, preferably the tensioning is provided using hydraulic tensioning.

Advantageously, the tensioning of the fasteners to provide a preload to the fasteners comprises providing an elastic deformation to the fasteners and/or the intermediate portion of the first annular flange and/or the intermediate portion of the second annular flange thereby achieving the advantages as described above.

In an embodiment, the method comprises providing a foundation and installing the foundation by hammering the foundation partly into the ground, wherein the ground may be onshore or offshore, preferably the hammering of the foundation partly into the ground is provided using a hydraulic impact hammer. In this embodiment the foundation is advantageously one of the first element or the second element, and wherein the first annular flange or the second annular flange is mounted to the foundation prior to the hammering of the foundation partly into the ground.

In an embodiment it has been found to be very beneficial that the first annular flange of the set of flange is welded to a foundation or a section thereof to be hammered into the ground e.g. into the seabed. The hammer may then rest and impact upon the toe portion of the first annular flange during the hammer process without requiring additional clearance between the heel portion and the hammer body.

BRIEF DESCRIPTION OF THE EXAMPLES AND DRAWING

The invention is being illustrated further below in connection with illustrative embodiments and with reference to the figures. The figures are schematic and may not be drawn to scale.

Figure 1:
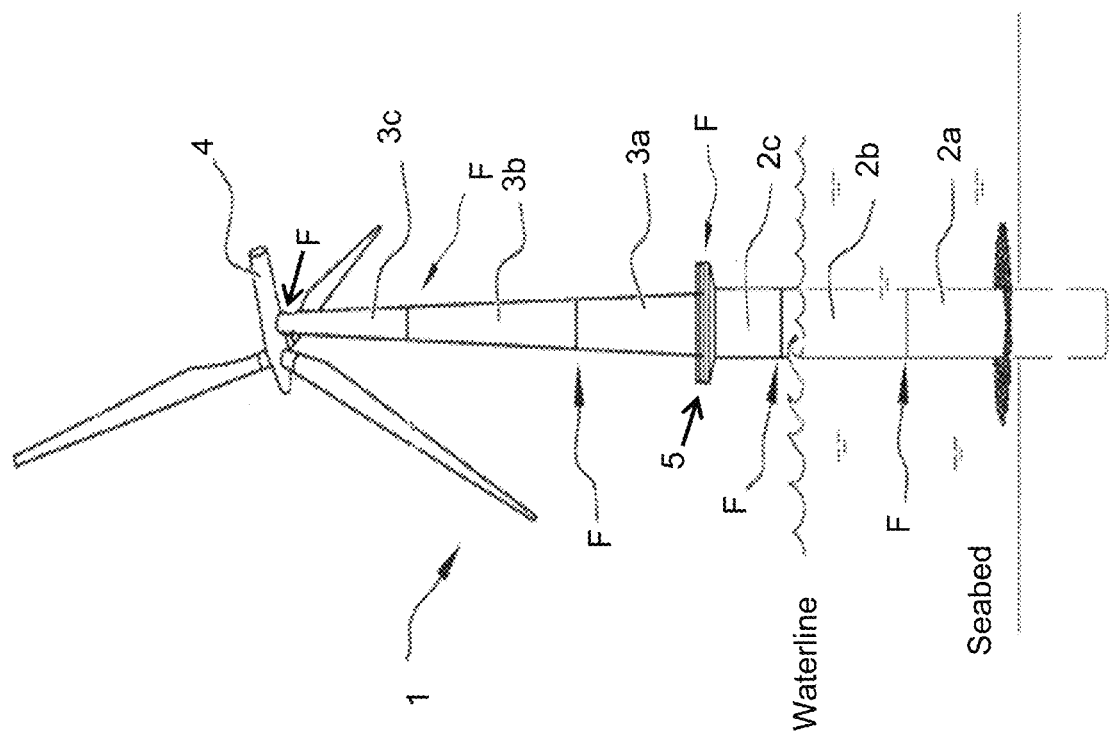
FIG. 1 is a schematic, perspective view of an installation of an embodiment of the invention.

The installation 1 shown in FIG. 1 is an offshore windmill installation. The installation 1 comprises a first foundation section 2a, which has been hammered partly into the ground at the seabed. A second foundation section 2b is mounted to the first foundation section 2a via a not shown flanged connection F, The second foundation section 2b is mounted to reach to near the waterline. A third foundation section 2c is mounted to the second foundation section 2b via a not shown flanged connection F. The third foundation section 2c comprises or carries a working platform 5. The third foundation section 2c is mounted to a first tower section 3a via a not shown flanged connection F. The first tower section 3a is mounted to a second tower section 3b via a not shown flanged connection F. The second tower section 3b is mounted to a third tower section 3c via a not shown flanged connection F. The first tower section 3a, the second tower section 3b and the third tower section 3c are gradually decreasing in diameter in upwards direction. Onto the third tower section 3c a crown section of a wind turbine 4 is mounted via a flanged connection F. At least one of the flanged connections is/are provided by a set of flanges of an embodiment of the invention as described above and/or as claimed in the appended claims. In a variation thereof the first foundation section 2*a* and the second foundation section 2*b* are provided in one piece or optionally mounted to each other before hammering into the ground at the seabed. Where a flanged connection is located below the sea level it may be beneficial to seal it to prevent water intrusion.

Figure 2:
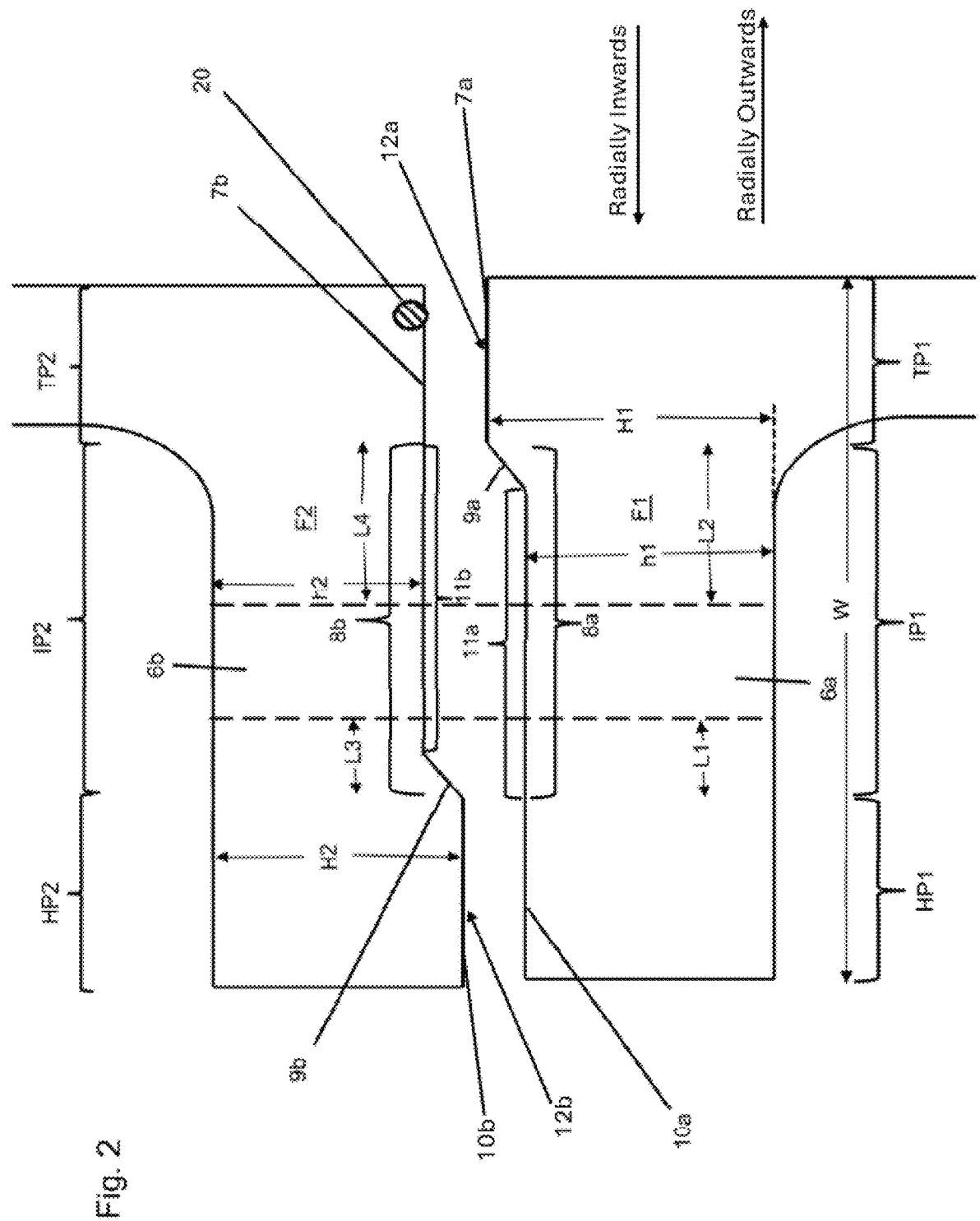
FIG. 2 is a cross-sectional view of a set of flanges of an embodiment of the invention.

The embodiment of the set of flanges shown in FIG. 2 comprises a first annular flange F1 and a second annular flange F2. The first annular flange F1 and the second annular flange F2 each comprises a plurality of through holes 6*a*, 6*b* along their respective annular extension. The plurality of through holes 6*a* of the first annular flange corresponds with the plurality of through holes 6*b* of the second annular flange to provide that the first annular flange and the second annular flange may be assembled with a first front side 12*a* of the first annular flange F1 facing a second front side 12*b* of the second annular flange F2.

The first front side 12*a* of first annular flange F1 comprises an annular toe surface section 7*a* and an annular intermediate region 8*a* comprising an annular beveled surface section 9*a* located radially inwards to the annular toe surface section 7*a* and radially outwards to the through holes 6*a*. The first front side 12*a* further comprises an annular flat surface section located radially inwards to the annular intermediate region and comprising an annular heel surface section 10*a* located radially inwards to the through holes 6*a*.

The second front side 12*b* of the second annular flange comprises an annular heel surface section 10*b* and an annular intermediate region 8*b* comprising annular beveled surface section 9*b* located radially outwards to the annular heel surface 10*b* section and radially inwards to the through holes 6*b*. The second front side 12*b* further comprises an annular flat surface section located outwards to the annular intermediate region 8*b* and comprising an annular toe surface section 7*b* located radially outwards to the through holes 6*b*.

A sealing ring 20 is located in an annular carving in said annular toe surface 7*b* of the second flange F2.

The annular toe surface 7*a* section of the first front side 12*a* is adapted to provide a contact surface with the annular toe surface section 7*b* of the second front side 12*b* and wherein the annular heel surface section 10*a* of the first front surface is adapted to provide a contact surface with the annular heel surface section 10*b* of the second front side 12*b*.

The intermediate region 8*a* of the first surface of the first flange F1 further comprises an annular intermediate surface section 11*a*. In the shown embodiment the intermediate surface section 11*a* is flat and in plane with the annular heel surface section 10*a*. In a variation thereof the intermediate surface section 11*a* may have carvings e.g. for reducing weight.

Likewise, the intermediate region 8*b* of the second surface of the second flange F2 further comprises an annular intermediate surface section 11*b*. In the shown embodiment the intermediate surface section 11*a* is flat and in plane with the annular toe surface section 7*b*. In a variation thereof the intermediate surface section 11*b* may have carvings e.g. for reducing weight.

The first annular flange F1 comprises from inside and radially outwards a heel portion HP1 comprising the annular heel surface section 10*a*, an intermediate portion IP2 comprising the annular beveled surface section 9*a* and the annular intermediate surface section 11*a*, and a toe portion TP1 comprising the annular toe surface section 7*a*. The second annular flange F2 comprises from inside and radially outwards a heel portion HP2 comprising the annular heel surface section 10*b*, an intermediate portion IP2 comprising the annular beveled surface section 9*b* and the annular intermediate surface section 11*b*, and a toe portion TP2 comprising the annular toe surface section 7*b*.

The first annular flange F1 has a first average toe thickness H1 at its heel portion HP1 and the second annular flange F2 has a second average heel thickness H2 at its heel portion HP2. The first flange F1 and the second flange F2 have a flange width W.

The first annular flange F1 has a first average intermediate thickness h1 at its intermediate portion and the second annular flange F2 has a second average intermediate thickness h2 at its intermediate portion.

The through holes 6*a* in the first annular flange F1 are located to pass through the first front side 12*a* at said annular intermediate region 8*a* at a distance L1 from said annular heel surface section 10*a* of said first annular flange F1 and at a distance L2 from said annular toe surface section 7*a* of said first annular flange.

The through holes 6*b* in said second annular flange F2 are located to pass through the second front side 12*b* at said annular intermediate region 8*b* at a distance L3 from said annular heel surface section 10*b* of said second annular flange F2 and at a distance L4 from said annular toe surface section 7*b* of said second annular flange F2.

Figure 3:
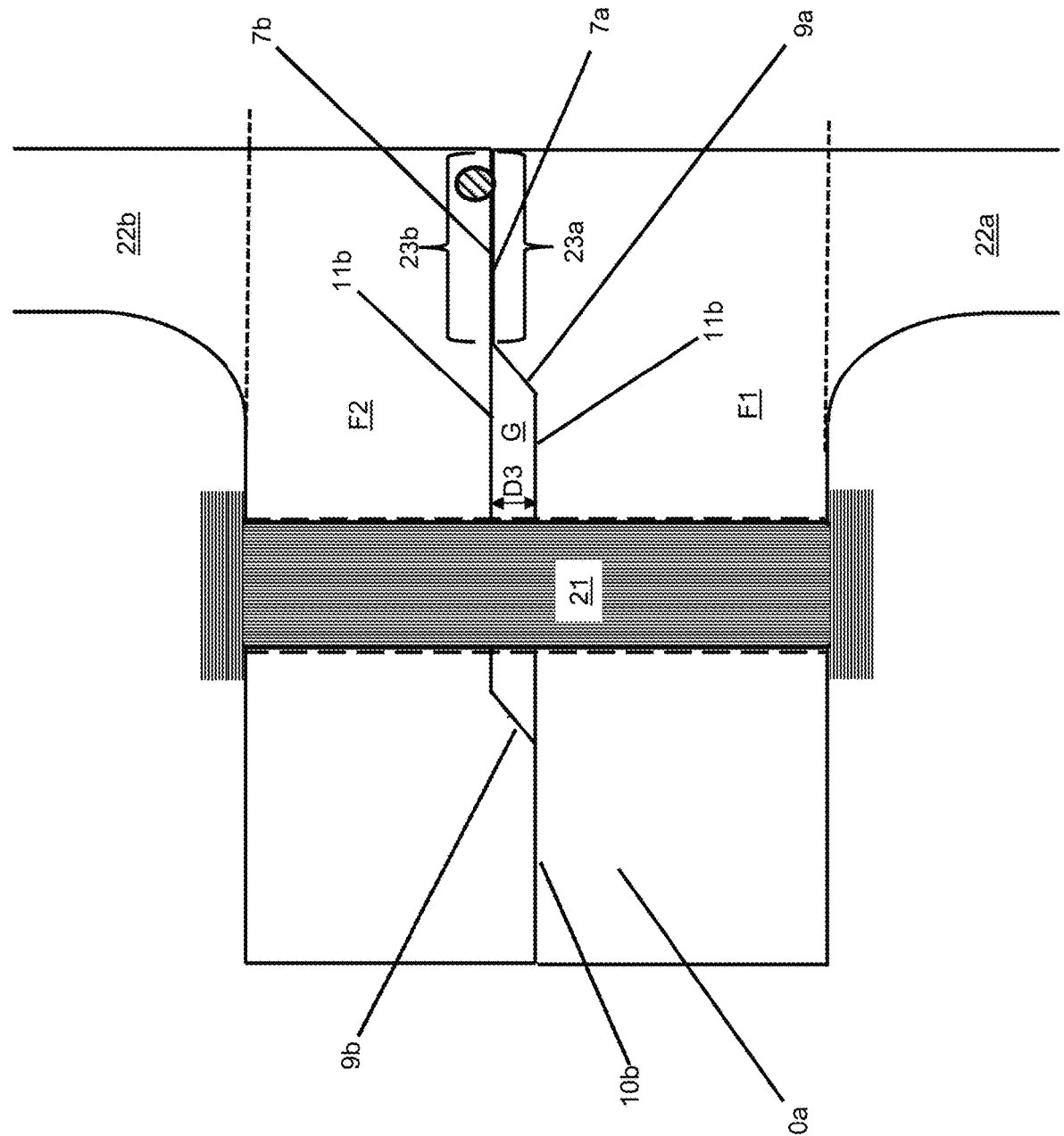
FIG. 3 is a cross-sectional view of the set of flanges of FIG. 3 in assembled condition.

In FIG. 3, the set of flange are in assembled condition and an annular gap G is formed by the annular beveled surface section 9*a* and the annular intermediate surface section 11*a* of the first annular flange F1 and annular beveled surface section 9*b* and the annular intermediate surface section 11*b* of the second annular flange F2. Thereby the annular beveled surface section 9*a* of the first annular flange F1 forms a radially inner beveled border of the gap G and the annular beveled surface section 9*b* of the second annular flange F2 forms a radially outer beveled border.

The first annular flange F1 and the second annular flange F2 are disconnectable assembled to each other with the first front side 12*a* of the first flange F1 facing the second front side 12*b* of the second flange F2, such that the annular toe surface section 7*a* of the first annular flange F1 and the annular toe surface section 7*b* of the second annular flange F2 are in surface to surface contact with each other forming an annular toe contact region having an annular toe contact width 23*a* and wherein the annular heel surface section 10*a* of the first annular flange F1 and the annular heel surface section 10*b* of the second annular flange F2 are in surface to surface contact with each other forming an annular heel contact region having an annular heel contact width 23*b*.

The first annular flange F1 and the second annular flange F2 are assembled and fixed using fastening elements 21 inserted through corresponding through holes of the first annular flange F1 and second annular flange F2 respectively. Thereby the fastening elements 21 pass through the annular gaP G, preferably at a distance from the annular beveled surface section 9*a* of the first annular flange F1 and at a distance from the annular beveled surface section 9*b* of the second annular flange F2, thereby enabling that the fasteners 21 may be tensioned to provide an elastic deformation of the fasteners and/or of the intermediate portions IP1 of the first annular flange F1 and/or the intermediate portion IP2 of the second annular flange F2.

The first annular flange F1 has a first neck portion 22*a* with a protruding length 23*a* and the second annular flange F2 has a second neck portion 22*b* with a protruding length 23*b*. The first annular flange F1 is advantageously mounted to the not shown first element via its first neck portion 22*a* and the second annular flange F2 is advantageously mounted to the not shown first element via its second neck portion 22b.

In this embodiment the first annular flange F1 is illustrated as being the lowermost annular flange and the second annular flange F2 is illustrated as being the uppermost annular flange. It should be understood that in another embodiment, the second annular flange F2 may be the lowermost annular flange and the first annular flange F1 may be the uppermost annular flange.

Figure 4:
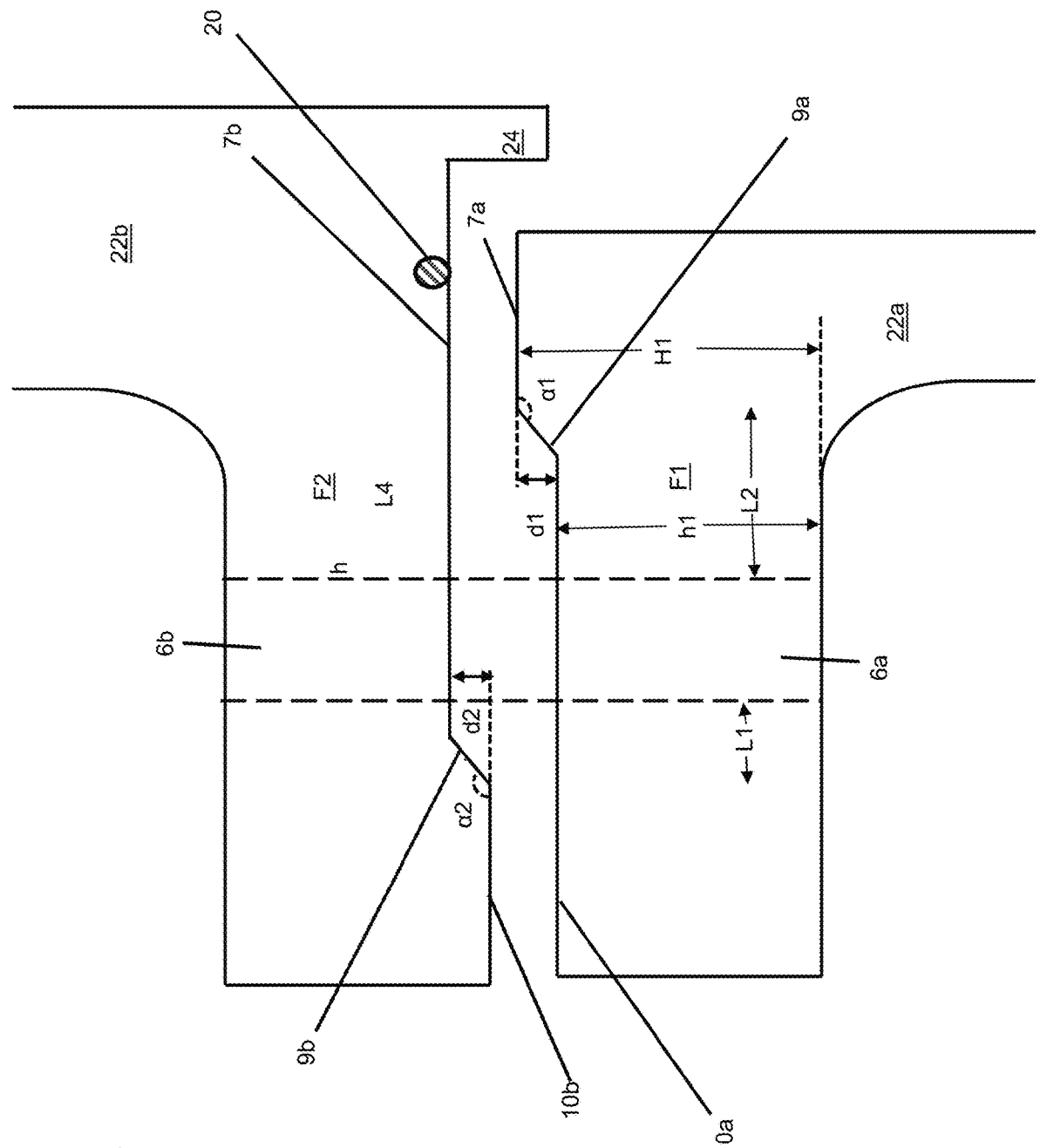
FIG. 4 is a cross-sectional view of a set of flanges of another embodiment of the invention.

The set of flanges shown in FIG. 4 differs from the set of flanges of the embodiment of FIG. 3 in that it comprises a skirt 24.

When the first annular flange F1 and the second annular flange F2 are mounted to each other the annular spade formed between the skirt 24 and the first annular flange may be filled with sealing material and/or grout as described above.

As shown in FIG. 4, the annular beveled surface section 9a of the first annular flange F1 is sloping downwards from the annular toe surface section 7a of the first annular flange F1 to a depth d1 thereby forming an angle $\alpha 1$ between the annular beveled surface section 9a of the first annular flange F1 and the annular toe surface section 7a of the first annular flange F1.

The second annular flange is sloping downwards from the annular heel surface section of the second annular flange to a depth d2 thereby forming an angle $\alpha 2$ between the annular beveled surface section 9b of the second annular flange F2 and the annular heel surface section 10b of the second annular flange F2

In the shown embodiment d1 and d2 are identical and $\alpha 1$ and $\alpha 2$ are identical. In variations thereof d1 and d2 differ from each other and/or $\alpha 1$ and $\alpha 2$ differ from each other.

Figure 5:
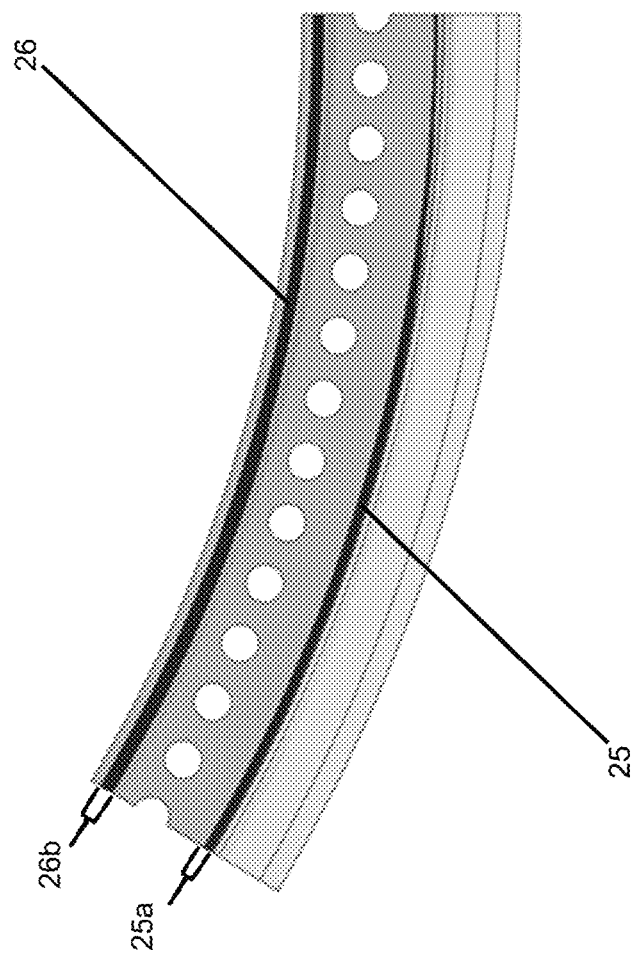
FIG. 5 is a view of a front face of an annular flange of a set of flanges of an embodiment of the invention showing the annular toe surface section and the annular heel surface section.

FIG. 5 shows the front face of a section of an annular flange of a set of flanges. The annular toe contact region 25 having an annular toe contact width 25b and the annular heel contacting region 26 having an annular heel contact width 26b are shown.

The invention claimed is:

1. A set of flanges comprising a first annular flange having a first front side and a second annular flange having a second front side, wherein said first annular flange and said second annular flange each comprises a plurality of through holes along their respective annular extension, wherein said plurality of through holes of the first annular flange corresponds with said plurality of through holes of the second annular flange to provide that said first annular flange and said second annular flange are adapted for being assembled with the first front side facing the second front side of said respective first annular flange and second annular flange, wherein said first front side of said first annular flange comprises an annular toe surface section and an annular intermediate region comprising an annular beveled surface section located radially inwards to the annular toe surface section and radially outwards to said through holes, wherein said first front side further comprises an annular flat surface section located radially inwards to the annular intermediate region and comprising an annular heel surface section located radially inwards to said through holes, wherein said second front side of said second annular flange comprises an annular heel surface section and an annular intermediate region comprising an annular beveled surface section located radially outwards to the annular heel surface section and radially inwards to said through holes, wherein said second front side further comprises an annular flat surface section located outwards to the annular intermediate region and comprising an annular toe surface section located radially outwards to said through holes, wherein said annular toe surface section of said first front side is adapted to provide a contact surface with said annular toe surface section of said second front side and wherein said annular heel surface section of said first front surface is adapted to provide a contact surface with said annular heel surface section of said second front side, wherein said annular beveled surface section of said first annular flange is sloping downwards from said annular toe surface section of said first annular flange to said annular intermediate surface section of said first annular flange through which the through holes of the first annular flange are passing with an angle $\alpha 1$, and wherein said annular beveled surface section of said second annular flange is sloping downwards from said annular heel surface section of said second annular flange to an annular intermediate surface section of said second annular flange through which the through holes of the second annular flange are passing with an angle $\alpha 2$, wherein the angle $\alpha 1$ and the angle $\alpha 2$ independently of each other is from more than 90° to less than 180°.

2. The set of flanges of claim 1, wherein said plurality of through holes of the first annular flange corresponds with said plurality of through holes of the second annular flange in that a plurality of the through holes of the first annular flange being located complementary to respective through holes of the plurality of through holes of the second annular flange for assembling the first annular flange and the second annular flange to each other.

3. The set of flanges of claim 1, wherein said annular intermediate region of said first front side comprises an annular intermediate surface section located between said annular beveled surface section and said annular heel surface section of said first annular flange and wherein said annular intermediate region of said second front side comprises an annular intermediate surface section located between said annular beveled surface section and said annular toe surface section of said second annular flange.

4. The set of flanges of claim 3, wherein said first annular flange comprises from inside and radially outwards a heel portion comprising said annular heel surface section, an intermediate portion comprising said intermediate region comprising said annular beveled surface section and said annular intermediate surface section, and a toe portion comprising said annular toe surface section and wherein said second annular flange comprises from inside and radially outwards a heel portion comprising said annular heel surface section, an intermediate portion comprising said annular beveled surface section and said annular intermediate surface section and a toe portion comprising said annular toe surface section.

5. The set of flanges of claim 4, wherein said plurality of through holes of said first annular flange are located at said intermediate portion of the first annular flange and wherein said plurality of through holes of said second annular flange are located at said intermediate portion of the second annular flange.

6. The set of flanges of claim 4, wherein said first annular flange has a first average toe thickness (H1) at its heel portion determined at a location comprising said annular heel surface section and determined perpendicular to said annular heel surface section, wherein said second annular flange has a second average heel thickness (H2) at its heel portion determined at a location comprising said annular heel surface section and determined perpendicular to said annular heel surface section, wherein said first flange and said second flange have a flange width (W) determined from and including the annular heel surface section and to and including the annular toe surface section of said respective first and second flanges, wherein each of said first average toe thickness (H1) and said second average heel thickness (H2) independently of each other is at least 15% of the flange width (W).

7. The set of flanges of claim 6, wherein said first annular flange has a first average intermediate thickness (h1) at its intermediate portion determined at a location comprising said annular intermediate surface section and determined parallel to the first average toe thickness (H1), wherein said second annular flange has a second average intermediate thickness (h2) at its intermediate portion determined at a location comprising said annular intermediate surface section and determined parallel to the second average heel thickness (H2), wherein the first average intermediate thickness (h1) is at least 50% of the first average toe thickness (H1), and/or wherein the second average intermediate thickness (h2) is at least 50% of the second average heel thickness (H2).

8. The set of flanges of claim 1, wherein said annul ar beveled surface section of said first annular flange is sloping downwards from said annular toe surface section of said first annular flange to a depth (d1) determined as the distance between a plan containing said annular toe surface section of said first annular flange and an offset parallel plan containing the location where said annular beveled surface section meets the annular intermediate surface section of said first annular flange, and/or wherein said annular beveled surface section of said second annular flange is sloping downwards from said annular heel surface section of said second annular flange to a depth (d2) determined as the distance between a plan containing said annular heel surface section of said second annular flange and an offset parallel plan containing the location where said annular beveled surface section meets the annular intermediate surface section of said second annular flange.

9. The set of flanges of claim 8, wherein the depth (d1) of the first annular flange and the depth (d2) of the second annular flange, independently of each other is from 0.1 mm to 2 cm.

10. The set of flanges of claim 1, wherein said annular toe surface section and said annular beveled surface section of said first annular flange are located radially adjacent to each other with a rounded transition edge there between, wherein the rounded transition edge has a rounding radius of up to 25 mm and/or wherein said annular heel surface section and said annular beveled surface section of said second annular flange are located radially adjacent to each other with a rounded transition edge there between, wherein the rounded transition edge has a rounding radius of up to 25 mm.

11. The set of flanges of claim 1, wherein the through holes in said first annular flange are located to pass through the first front side at said annular intermediate region at a distance L1 from said annular heel surface section of said first annular flange and at a distance L2 from said annular toe surface section of said first annular flange, and/or wherein the through holes in said second annular flange is located to pass through the second front side at said annular intermediate region at a distance L3 from said annular heel surface section of said second annular flange and at a distance L4 from said annular toe surface section of said second annular flange.

12. An installation comprising a flange connection between a first element and a second element, wherein the first element and the second element are mounted to respective first and second flanges of the set of flanges according to claim 1.

13. The installation of claim 12, wherein the first annular flange is mounted to the first element and the second annular flange is mounted to the second element and wherein the first annular flange and the second annular flange are disconnectably assembled to each other with the first front side of the first flange facing the second front side of the second flange, wherein the annular toe surface section of the first annular flange and the annular toe surface section of the second annular flange are in surface to surface contact with each other forming an annular toe contact region having an annular toe contact width and wherein the annular heel surface section of the first annular flange and the annular heel surface section of the second annular flange are in surface to surface contact with each other forming an annular heel contact region having an annular heel contact width and wherein the assembled flanges comprises an annular gap located radially between the annular toe contact region and the annular heel contact region, wherein the annular gap has an radially inner beveled border and a radially outer beveled border.

14. The installation of claim 13, wherein the annular gap has a radially inner beveled border and a radially outer beveled border, wherein the radially inner beveled border is formed by said annular beveled surface section of said first annular flange and wherein said radially outer beveled border is formed by said annular beveled surface section of said second annular flange.

15. The installation of claim 13, wherein the annular gap is formed by the annular intermediate region of the first annular flange and the annular intermediate region of the second annular flange.

16. The installation of claim 15, wherein the annular gap has a distance (D3) between the annular intermediate surface section of the first annular flange and the annular intermediate surface section of the second annular flange which is equal to the sum of the depth (d1) of the first annular flange and the depth (d2) of the second annular flange.

17. The installation of claim 12, wherein the first annular flange and the second annular flange are assembled comprising fixing using fastening elements inserted through said corresponding through holes of said respective first annular flange and second annular flange, wherein said fastening elements comprises threaded fasteners.

18. The installation of claim 17, wherein the fastening elements pass through an annular gap at a distance from said annular beveled surface section of said first annular flange and at a distance from said annular beveled surface section of said second annular flange.

19. A method of providing an installation comprising a flange connection between a first element and a second element, wherein the first element and the second element are mounted to respective first and second flanges of the set of flanges, wherein the method comprises providing said first element, said second element and said set of flanges according to claim 10, mounting the first annular flange to the first element by welding, mounting the second annular flange to the second element by welding and assembling first annular flange to the second annular flange, wherein the assembling of the first annular flange to the second annular flange comprises providing that the annular toe surface section of the first annular flange and the annular toe surface section of the second annular flange are in surface to surface contact with each other forming an annular toe contact region having an annular toe contact width and providing that the annular heel surface section of the first annular flange and the annular heel surface section of the second annular flange are in surface to surface contact with each other forming an annular heel contact region having an annular heel contact width and providing that the assembled flanges comprises an annular gap located radially between the annular toe contact region and the annular heel contact region.

20. The method of claim 19, wherein the assembling of the first annular flange to the second annular flange comprises fixing the first annular flange and the second annular flange by inserting fastening elements through corresponding through holes of said respective first annular flange and second annular flange, wherein said fastening elements comprises threaded fasteners, wherein said method comprises tensioning said fasteners, to provide a preload to said fasteners, and wherein said tensioning of said fasteners to provide a preload to the fasteners comprises providing an elastic deformation to the fasteners and/or the intermediate portion of said first annular flange and/or the intermediate portion of the second annular flange.

* * * * *